April 18, 1967   O. WERTHER ET AL   3,314,266
METHOD OF MAKING PIPE COUPLING BLANKS
Filed May 7, 1962   2 Sheets-Sheet 1
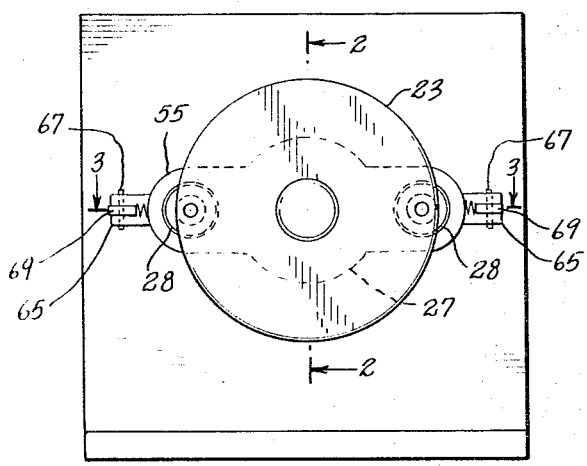
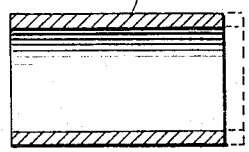
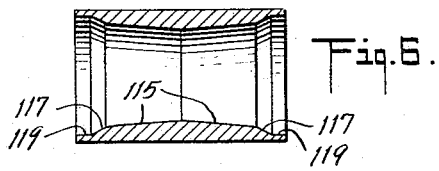
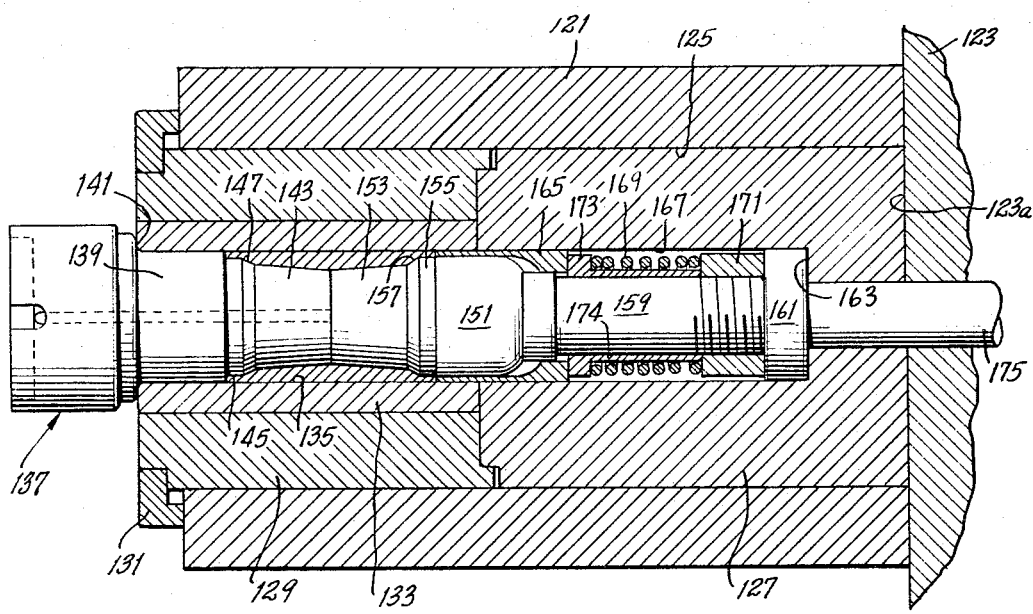
INVENTORS
ODIN WERTHER +
BY CHARLES PATRICK McCABE
ATTORNEY April 18, 1967   O. WERTHER ETAL   3,314,266
METHOD OF MAKING PIPE COUPLING BLANKS
Filed May 7, 1962   2 Sheets-Sheet 2
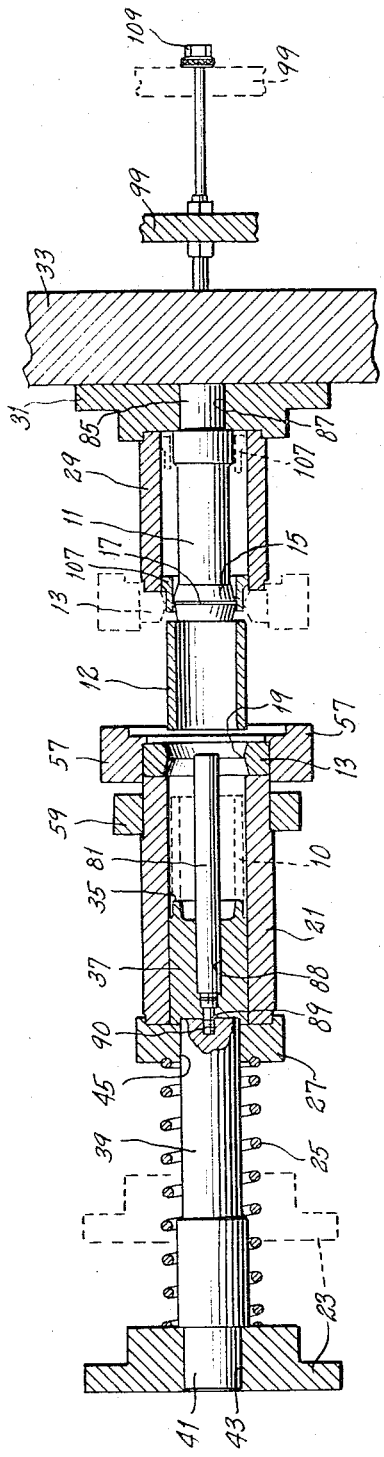
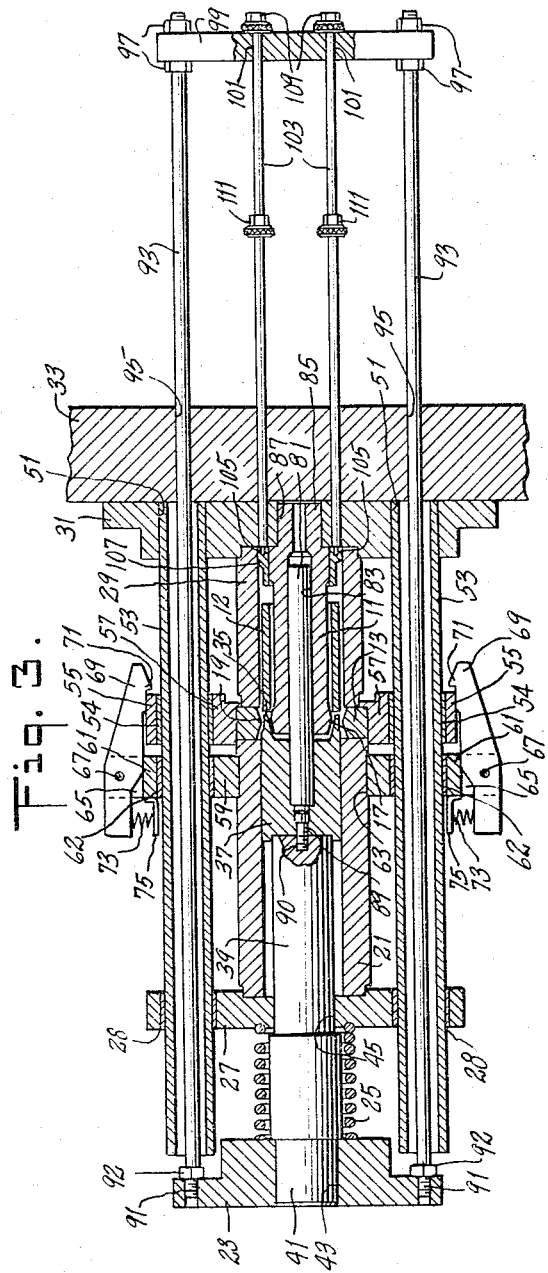
INVENTORS
ODIN WERTHER &
BY CHARLES PATRICK McCABE
ATTORNEY

United States Patent Office 3,314,266
Patented Apr. 18, 1967

3,314,266
METHOD OF MAKING PIPE COUPLING BLANKS
Odin Werther, East Cleveland and Charles P. McCabe, Rocky River, Ohio, assignors to Republic Steel Corporation, Cleveland, Ohio, a corporation of New Jersey
Filed May 7, 1962, Ser. No. 192,902
5 Claims. (Cl. 72—256)

This invention relates to the manufacture of pipe couplings or the like which are required to be provided with internal threads engageable with the threads on aligned pipes, tubes or rods, or similar elongated elements, to effect the coupling of these elements. The invention particularly relates to the process of preparing a blank for a coupling of this type prior to forming the threads therein, so that the inner surface of the blank in which the threads are to be formed will be such that threads cut or rolled therein will be of true form for engagement with the corresponding threads of the pipe or other elongated element.

Conventionally, pipe couplings and similar elements performing the function of a nut are of such form as to provide an annular wall extending about an axis, the threads being cut or rolled in the inner surface of this wall extending about the axis. Especially in the manufacture of pipe couplings heretofore it has been the practice to provide by suitable methods of manufacture a blank in which the annular wall is defined by a generally cylindrical exterior surface and by an inner generally cylindrical surface which is intended to be concentric with the exterior cylindrical surface. Such blanks may be provided, for example, by cutting off sections of suitable length from a continuous tubular member, the tubular member being produced by any suitable method of manufacture, such as tube drawing, forging or the like. Conventionally, also such blanks are subjected to a forming process, which may be carried out by placing the blank in a suitable die, for changing the form of the wall from one with a generally cylindrical inner surface extending about and along the axis of the coupling to a form which provides a contour of this inner surface along the axis which is suitable for the thread to be cut or rolled in the inner surface. As is well konwn, for example, a pipe thread, as distinguished from a machine or screw thread, requires that the surface extending inwardly of the coupling from each of its ends shall be generally conical and that the thread shall be cut with generally uniform depth along the thread helix on the conical surface. Corresponding threads of uniform depth are cut on the conical surfaces of the ends of the pipes or other elongated elements for engagement with the coupling.

In carrying out the conventional methods which briefly have been referred to in the previous paragraph, it is found that threads are produced which are not of uniform depth, or which become torn or damaged in the rolling or cutting, because of the condition existing in the blank that the annular wall thereof is not truly cylindrical, so that the thread forming tool cannot properly engage and work upon the blank. Especially when the inner surface of this annular wall which extends about the axis of the coupling is not truly cylindrical in the blank and particularly is not of truly circular contour about and at each point along the axis of the coupling, that is to say, at each point along the contour of the inner surface of the coupling blank to be threaded which is in the plane of and extends along the axis, tearing and damage occur. In the machining operation of cutting the thread, and especially a pipe thread on the inner surface of the coupling, or of rolling the thread into this inner surface, it is requisite that the surface shall be defined in cross-section by a true circle at each point along the axis in order that the threads shall be truly formed in the surface with the correct depth as well as with the correct and complete formation of the surfaces of the thread itself at each point along its helical extent. It is essential, therefore, that the blank shall be of truly circular form, either cylindrical or conical, at the inner surface thereof.

It is an object of the invention to prepare a pipe coupling blank or the like for threading with an internal thread of true form and depth.

It is another object of the invention to provide a pipe coupling blank or the like which will have an inner surface of true circular contour in each plane transversely of the axis of the coupling.

It is a further object of the invention to prepare a pipe coupling blank formed with an annular generally cylindrical wall so that its inner surface will be defined by a true cylinder about the axis of the coupling.

It is an additional object of the invention to prepare a pipe coupling blank or the like with true cylindrical inner surface preparatory to a conventional upsetting operation to secure the desired contour of the inner surface in the plane which contains the axis, in order to conform to the desired form of the thread to be formed in this inner surface of the coupling.

It is a still further object of the invention to provide a method of produucing an internally threaded pipe coupling in which the thread will extend as a true helix about the axis of the coupling and will be of correct cross-sectional form along the helix.

The invention is concerned with a method of preparing a pipe coupling blank which is in the form of an annular generally cylindrical wall. This method comprises steps which will secure initially a truly cylindrical inner surface of the blank about the axis, thereby providing a surface of truly circular contour at all points along the axis of the coupling. As will be explained, this circular contour is maintained in the subsequent operations so that threads of the desired type may be cut or rolled into this inner surface of the coupling.

In order to carry out the method in its essential features a blank coupling of annular form to be threaded for engaging the threads of a pipe or similar member is disposed at one side of an annular circular extruding orifice, so that the annular wall of the blank extends about and is generally coaxial with the axis of the orifice, and is in alignment with the annular orifice. The blank then is moved parallel to the axis concomitantly while forcing the annular wall thereof through the annular circular orifice and so that at least the inner surface of the blank about the axis of the orifice is trued to a circular contour concentric with the axis of the orifice. By these method steps the initial blanks, which it has been found are ordinarily deformed either as a result of the methods of manufacture of the blank or because of forces brought thereon in the handling, or for other reasons, may be trued to a substantially precise circular contour about the axis. This contour in the method of the invention, as the blank is extruded through the extruding orifice, develops a cylindrical surface about the axis which is of true circular contour at each point along the axis. That is to say, the contour of the surface in the plane of the axis and generally parallel to the axis is a straight line equidistant at all points from the axis.

It is a further feature of the invention that when an initial blank having an annular wall thus is altered to insure that at least the inner surface thereof shall be truly cylindrical, the subsequent operation may be carried out for developing the desired contour in the plane of the axis and extending along the axis that is suitable for the internal thread to be cut or rolled, thereby to secure a modified coupling blank of true circular contour at the inner surface thereof, whether the inner surface is to be cylindrical or whether it is to be conical for the purpose respectively of cutting or rolling machine or screw threads or of cutting or rolling pipe threads. This subsequent step of the process carried out on the trued blank may be the same as that in conventional use, namely, that of upsetting the material of the trued blank, as by placing this blank in a die having the desired form of the inner die member which will produce the desired contour of the inner surface. It is significant in the invention that the circular contour produced in the blank altered by the extrusion step as described will be maintained in the modified blank.

When the coupling blank as initially conventionally made is subjected to the steps of the method of the invention to secure the truly circular contour in the modified blank as above described, it is found that not only are the threads, which may be produced either by cutting or by rolling, are of proper form fully along the helical extent thereof to match and to fit to the male threads on an element upon which the coupling is to be screwed, but that the loss from defective threaded couplings is greatly decreased. The loss of couplings which are required to be scrapped when produced by the present methods is of the degree of about 50% and, by the method of the invention, this loss has been found to be reduced to about 7 to 10% of the number of threaded couplings which are produced. This significant reduction in loss due to defective couplings represents a very large saving in the cost of producing pipe couplings or like coupling elements and is an important advantage of the invention. The wear upon and damage to the tools and the cost of maintaining these tools in proper condition for cutting or rolling also is greatly reduced and represents a further economic saving.

The objects and features of the invention will be more clearly understood from the description of the drawings to follow in which:

FIG. 1 shows an end view of apparatus for carrying out the method of the invention;

FIG. 2 shows a vertical section on line 2—2 of FIG. 1 with an initial coupling blank inserted for operation thereon;

FIG. 3 shows a horizontal section on line 3—3 of FIG. 1 with the parts of the apparatus in position in which the extrusion of the coupling blank has been completed;

FIG. 4 shows in section the initial coupling blank before the extrusion operation thereon;

FIG. 5 shows the altered blank after the extrusion is completed;

FIG. 6 shows a blank of modified contour for receiving pipe threads; and

FIG. 7 shows apparatus for producing from the blank of FIG. 5 the modified blank of FIG. 6.

FIGS. 1, 2 and 3 show diagrammatically the apparatus in which the method of the invention may be carried out by which is secured a blank of trued circular contour, particularly one having an inner surface which is truly circular in the contour of its cross-section, this inner surface being cylindrical and of the same diameter along the length of the extruded blank. To carry out this method upon an initial blank 10, an extrusion die is utilized which comprises an inner member 11 and an outer annular member 13, the outer member being supported for movement as hereinafter described along the axis of the die with respect to the inner member 11. As shown in FIG. 2, the inner member 11 has an enlarged left hand end portion 15 which is of double conical form and provides adjacent the base portions of the cones a cylindrical surface 17 of narrow width. This cylindrical surface extending about the axis of the die determines the inner surface and size of the extruded blank 12, FIG. 3, as more particularly described below. It is this inner surface of the blank that is of particular importance in the preparation of the blank for receiving internal threads which are to be formed in the coupling.

The outer annular member 13 also is formed with two converging conical surfaces which meet a cylindrical surface 19 of narrow width extending about the axis of the die. This cylindrical surface 19 of the annular member 13 may and preferably does determine the outer surface and size of the extruded blank 12, as will be more clearly understood from the description to follow. To carry out the steps of the invention the initial blank 10 must be forced through the annular space between the cylindrical surface 17 and the cylindrical surface 19 when the annular member 13 is in the position shown in dotted lines in FIG. 2 with respect to the inner member 11, this being also the relation of the members 13 and 11 shown in FIG. 3 in which the extrusion has been completed.

In order to properly dispose the blank 10 with respect to the extrusion die for the extruding operation, the outer annular member 13 of the die may be moved to the dotted position of FIG. 2 and separated from the structure shown at the left of this annular member in FIG. 2 which includes an annular cylindrical pressure transfer member 21. With the annular member 13 and its supporting structure in the dotted line position, space is provided between this member and the end of the pressure transfer member 21 for inserting the blank 10 into the space within the annular wall of the pressure transfer member 21, that is, to the dotted line position of the blank 10 shown in FIG. 2. The left hand end of the blank 10 may be brought into engagement with means which will effect the movement of the blank 10 toward the right and apply the pressure thereto for forcing this blank through the extrusion die, as will be further described. After inserting the blank 10 within the wall of the pressure transfer member 21, the outer annular member 13 of the die may be moved again to the full line position of FIG. 2 and, by means to be described, securely held in abutting relation to the right hand end of the pressure transfer member 21.

With the members of the apparatus as shown in FIG. 2 in the position shown in full lines, the pressure member 21 may be moved toward the right to move the outer die member 13 and its support structure toward the right to the dotted line position of FIG. 2, the full line position of FIG. 3. Such movement is effected by means of a flange member 23, movement of which is effected to the dotted position in FIG. 2 by suitable power means (not shown); this flange member 23 acting through spring 25 and spring engaging member 27 secured to the left end of the annular pressure transfer member 21 to transmit pressure to the annular die member 13 and its supporting structure. The left hand part of the apparatus of FIG. 2 thus will be moved as a whole toward the right to positions shown in dotted lines with the annular outer member of the die 13 abutting the left end of a cylindrical pressure receiving or counter member 29 which is secured in cantilever relation to a flanged member 31 supported by and abutting a reaction block 33. The pressure applied to the flange member 23 thus is transmitted to the block 33 and the outer die member 13 is securely held in place in proper relation to the inner die member 11.

In such movement that portion of the apparatus between the annular die member 13 and the flange member 23 is moved to the dotted positions as a whole without compression of the spring 25. As will be clear from FIG. 2, the blank 10 disposed within the space defined by the wall of the pressure transfer member 21 will be moved toward the right by engagement therewith of the annular rib 35 of an extrusion pressure member 37. In such movement the blank 10 will be moved to a position in which the right hand end thereof is adjacent the outer or left conical surface of the inner die member 11, ready for application of the necessary pressure to force the blank 10 through the annular space between the cylindrical surface 17 of the inner die member 11 and the inner cylindrical surface 19 of the outer die member 13.

With the blank 10 disposed within the pressure member 21 and with the wall of this pressure member abutting the outer die member 13 and with the annular rib 35 adjacent the left end of the blank 10, further movement of the flange 23 toward the right from the dotted position of FIG. 2 is effective to compress the spring 25 to the form shown in FIG. 3. During this compression the pressure transfer member 21 is not further moved but maintains the pressure on the annular die member 13 and the bearing of this die member against the counter member 29. During this further movement of the flange 23, however, to the position of FIG. 3 concomitantly with such compression of the spring 25, a shaft 39 provided with a turned end 41 driven into or otherwise secured in an opening 43 of the flange 23, the axis of this shaft being in alignment with the axis of the extrusion die members 11, 13 and the spring 25 surrounding this shaft, as shown, is moved toward the right into the space within the annular pressure transfer member 21. The shaft 39 passes through a suitable bearing opening 45 in the spring engaging member 27 and the right hand end of the shaft 39 abuts and is secured to the extrusion pressure member 37 which carries the annular rib 35.

Concomitantly with such movement of shaft 39 and compression of the spring 25, therefore, the extrusion pressure member 37 will be moved from the position of FIG. 1 in relation to the pressure transfer member 21 to the position shown in FIG. 3, the extrusion pressure member 37 bearing in sliding relation on the inner surface of the wall of the pressure transfer member 21. In this movement the right hand end of the annular rib 35 will come at once into engagement with the left end of the cylindrical blank 10 and, upon completion of the full movement of the extrusion pressure member 37 to the position of FIG. 3, the blank will have been forced through the annular orifice between the member 13 of the die and the member 11 thereof. As will be noted in FIG. 3 the right hand end of the annular rib 35 extends past the cylindrical extrusion surfaces 17, 19 so as to move the extruded blank 12 fully to the position of FIG. 3 beyond these forming surfaces. The outer and inner diameters of the annular rib 35 are such as to provide for such movement of the rib between the surfaces 17, 19 without engagement.

It will be understood, when the blank 12 reaches the position shown in FIG. 3, that it is in a form which is the result of subjecting blank 10 to an extruding operation which, especially with respect to the inner surface of the blank, is effective to produce a surface of precisely circular contour about the axis at each point along the length of the blank and, therefore, this inner surface is is cylindrical. If, as in the preferred method, the diameter of the cylindrical surface 19 of the outer member 13 of the die is such as also to bear upon the outer portion of the blank 10, the outer surface of the extruded blank 12 also will be formed to a precise circular contour about the axis and will be cylindrical and parallel to and concentric with the inner surface of the extruded blank. As above generally stated, the extruded blank 12 now is in condition to be subjected to further operations. That is to say, the threads may be formed directly upon the inner surface of the extruded blank 12, if a machine or screw thread is to be formed, or the blank may be subjected to further formation of the wall thereof to conform to the requisite surface for the threads, ordinarily conical for receiving a pipe thread. It will be understood that the subsequent forming of the wall of the coupling 12, such as is accomplished by upsetting, may be carried out so as to produce, if desired, other formations than the conical form for special purposes.

As shown more particularly in FIG. 3, the flanged member 31 which is secured by suitable means to the reaction member 33 is provided with openings 51 the axis of which are parallel to the axis of the extrusion die. The openings 51 receive tubular members 53 secured therein which extend in cantilever relation to the flange member 31 parallel to the axis of the die. The tubular members 53 serve as guide members for bearings 54, FIG. 3, respectively provided in the arms 55 of a member 57 in which is secured the outer die member 13, so that in the movement of the die member 13 between the full line position and the dotted line position of FIG. 2, or to the position of FIG. 3, the member 57 supported by the bearings 54 in the arms 55 moves in sliding relation along the tubular members 53. As above indicated, such movement is effected by the pressure transfer member 21 abutting the outer die member 13.

Also supported by the tubular members 53 is a ring member 59 having arms 61 carrying bearings 62 in sliding relation to the tubular members 53. The ring member 59 is secured on the pressure transfer member 21 against a shoulder 63 formed in the outer surface of the pressure transfer member 21, so that the ring 59 together with the member 21 will move parallel to the axis of the die.

The arms 61 of the ring member 59 rigidly support brackets 65 carrying fixed pins 67 upon which are pivoted latches 69 which are provided with hooks 71 engageable with the right hand faces of the arms 55 of the member 57. When, as above described, the die member 13 is to be moved to the dotted position of FIG. 2 to provide space for inserting the initial blank 10 within the annular transfer member 21, the hooks 71 of the latches may be disengaged from the arms 55 by pressing upon the left end of the respective latches against the action of compression spring 73 to release the die member 13 and its supporting structure from the structure supporting the pressure transfer member 21. After inserting the initial blank 10 within the annular pressure transfer member 21, the die member 13 and its supporting structure may be slidably moved toward the left upon the tubular members 53 until the die member 13 is in abutting relation to the right end of the pressure transfer member 21. The latches 69 then will be biased so that the hooks 71 are in engagement with the faces of the arms 55 by the action of the compression spring 73 disposed between the left end of each latch and a horizontal bracket 75 carried by each arm 61 of the ring member 59. It will be understood, when the whole structure to the left of the inner die member 11 then is moved to the dotted position of FIG. 2, that the parts which include the members 57, 59 and the die member 13 and the pressure transfer member 21 will be in the relation to each other and to the die member 11, as shown in FIG. 3. Movement of the flange 23 from the full line position to the dotted line position in FIG. 2 will effect this movement of the structure as a whole which is at the left of the inner die member 11 to the position in which the annular die member 13 and its supporting structure is shown in dotted lines in FIG. 2 with the initial blank 10 in position ready for the extrusion operation.

Further movement of the flange member 23 toward the right to the position of FIG. 3 does not change the position of the annular die member 13 or of the member 57 and its arms 55 which support this die member, nor does it change the position of the transfer member 21 and the ring member 59 which supports this pressure transfer member, the member 57 and the ring member 59 remaining locked together by the latches 69. The spring engaging member 27 also will remain in the position to which it has moved, together with the pressure transfer member 21, in sliding relation of its bearing 28 along the tubular members 53.

During the movement above described of the flange 23 to the dotted line position of FIG. 2 concomitantly with movement of the extrusion pressure member 37 and movement of the annular die member 13 to the dotted line position of FIG. 2, a center supporting spindle 81 carried by the extrusion pressure member 37 coaxially with the axis of the die also is moved toward the right to a position in which its right hand end is adjacent the left hand end of the inner die member 11. Upon further movement of the flange 23 with compression of the spring 25, this spindle 81 will enter a bore 83 provided within and coaxial with the axis of the inner die member 11. In this second part of the movement the spindle 81 will be moved fully into the bore 83 of the inner die member 11. The spindle 81 is of such diameter with respect to the bore 83 as to guide and support the extrusion pressure member 37 and the inner die member 11 in relation to each other. As shown in FIGS. 2 and 3, the inner die member 11 has a stub end 85 which is secured in a bore 87 in the flange member 31. The spindle 81 at its left portion is disposed in a bore 88 in the extrusion pressure member 37 and is provided at its left end with a shank 89 threaded in a hole 90 in the shaft 39. The flange 23, the shaft 39, the extrusion pressure member 37 and the spindle 81, therefore, move as a unit.

Disposed within the tubular members 53 and connected by threads 91 and nuts 92 to the flange 23 are rods 93 which extend also through holes 95 in the reaction member 33. The holes 95 may be of such size as to serve to guide the rods 93. The right hand end of each rod carries nuts 97 disposed at either side of and tightened upon a spanner member 99 which, therefore, moves in translation in the same manner as does the flange member 23. Through holes 101 in this spanner member 99 auxiliary rods 103 extend in sliding relation to the spanner member. At the left hand ends of the rods 103 threaded stub ends 105 are formed which are screwed into the annular wall of an ejector ring 107. Secured by suitable means to the right hand ends of the rods 103 are stops 109 at the outside of the spanner member 99. The rods 103 also carry stops 111 adjustably secured thereto. It will be understood from a consideration of FIGS. 2 and 3, in the movement of the flange member 23 to the dotted position of FIG. 2, that the spanner member 99 will move from the full line position shown in FIG. 2 to the dotted line position of this figure. At the end of this movement, this spanner member will come into engagement with the stops 109 on rods 103 without having effected any movement of the rods 103 with respect to which the spanner will have moved in sliding relation. Upon further movement of the flange member 23 to the position of FIG. 3, the spanner member 99 in engagement with the stops 109 will move the rods 103 toward the right, thereby drawing the ejector member 107 from the full line position shown in FIG. 2 to the dotted line position shown in this figure, that is to say, to the full line position shown in FIG. 3. In this movement the stops 111 which are secured on the rods 103 will have moved from a position adjacent the reaction member 33 to the position shown in FIG. 3. Thus, space is provided within the pressure receiving member or counter 29 within which the extruded blank 12 may become disposed, having passed through the annular opening of the extrusion die.

When the power means utilized for effecting the movement of the flange member 23 is operated so as to effect reverse movement of the flange member toward the left in FIGS. 2 and 3, this flange member will be moved from the position of FIG. 3 to the dotted line position of FIG. 2 concomitantly with expansion of the spring 25. This spring in this part of the reverse movement maintains the spring engaging member 27, the annular pressure transfer member 21 and the annular die member 13 in the position of FIG. 3, the die member bearing against the counter member 29. In this first part of the movement, however, the shaft 39 also is moved toward the left in the opening 45 and the spindle 81 is withdrawn from the bore 83 of the inner die member 11. The extrusion pressure member 37 also is moved toward the left relative to the pressure transfer member 21, the annular ribs 35 of this extrusion pressure member being withdrawn from the annular space of the extrusion die. In this first part of the reverse movement, the spanner member 99 will move toward the left until it engages the stops 111 on the rods 103, these rods sliding through the holes 101 of the spanner member 99.

While the spring 25 is fully expanded with the spring engaging member 27, the pressure transfer member 21 and the annular die member 13 still in the position of FIG. 3, the shaft 39 and the extrusion pressure member 37 will have returned to positions within the pressure transfer member, as shown in FIG. 2, but the flange member 23 only will have reached the dotted line position of FIG. 2. Further movement of this flange member toward the left will draw the spring engaging member 27, the pressure transfer member 21 and, by virtue of the latches 69, also the annular die member 13 and its supporting structure toward the left to move these parts to the position shown in full lines in FIG. 2.

In this second part of the movement of the flange member 23, the rods 93 will continue to draw the spanner member 99 toward the left, this spanner member now engaging the stops 111 to move the rods 103 also toward the left, thereby to move the ejector ring 107 into engagement with the right hand end of the extruded blank 12 and to force this extruded blank toward the left over the enlargement 15 of the inner die member 11 to the full line position of the extruded blank 12, shown in FIG. 2, in which position the blank 12 now of true cylindrical inner surface and preferably also of true cylindrical outer surface may be removed from the apparatus. The operations which have been described for forward and reverse movement of the parts may be repeated for inserting a new initial blank 10 and effecting the extruding operation as described to produce a new altered extruded blank 12 upon the application of the power to the flange member 23.

To enlarged scale, the initial blank 10 of annular form is shown in FIG. 4. In FIG. 5, to the same scale is shown the extruded blank 12. This blank 12 in the form in which it is removed from the extruding die, as described, has a greater length extending to the dotted line at the right hand end in FIG. 5, the thickness of the wall of the initial blank 10 having been reduced in forcing the blank 10 through the annular space between the die members 11 and 13. The extruded blank 12 then is cut to length, as shown in full lines in FIG. 5, preparatory to inserting this extruded and trimmed blank 12 in contour forming die now to be described in connection with FIGS. 6 and 7.

As illustrated in FIG. 6, the contour of the inner surface of the annular wall in the plane which contains the axis of the coupling blank is required to be such that the threads which are to be rolled in the inner surface of the blank will be of true form along the helix of the thread, this helix for a pipe thread being formed upon a cone. The inner surfaces 115 of the modified blank of FIG. 6, therefore, are conical. The surfaces 117, 119 of this blank are of conventional contour along the axis, that is, conical and cylindrical respectively to provide proper clearance for the rolling tool and for displacement of the metal as the thread is rolled by any suitable method and apparatus for rolling such thread as a pipe thread.

To produce the modified blank of FIG. 6 from the trimmed extruded blank 12 of FIG. 5, a compression die as shown in FIG. 7 is provided. This die comprises an outer die element confining structure 121 secured to and supported by a support 123. Within the annular wall of the structure 121 which may provide a cylindrical surface 125 and, in sliding relation to this surface, a die element 127 may be disposed in bearing relation at its right end upon the face 123a of the support 123. In abutting relation to the die element 127 a second die element 129 is disposed in sliding bearing relation to the cylindrical surface 125 of the structure 121, this die element 129 being retained against movement with respect to the structure 121 by a flanged retaining ring 131 which may be secured to the structure 121 by suitable means not shown. Within the die element 129 is disposed a sleeve 133 providing a true cylindrical inner surface 135 concentric with the surface 125 of the structure 121 and of such internal diameter as to receive the extruded blank 12 in bearing relation upon the outer surface of the blank 12. The right hand end of the sleeve 133 bears against the left end of the die element 127.

At the left of the device of FIG. 7 is shown a plug member 137 having a shank 139 slidably fitting to the inner surface 135 of the sleeve 133 and inserted at the left end of this sleeve with a shoulder 141 on the plug adjacent the shank 139 and bearing against the left end of this sleeve 133 to dispose the fully inserted plug in a definite relation to the sleeve. The right hand portion of the plug 137 provides a conical part 143 concentric with the axis of the shank 139 and of the sleeve 133, this conical part 143 being connected to a cylindrical part 145 in shouldered relation to the shank 139 by a conical portion 147 of greater inclination to the axis than the conical part 143. The surfaces of the conical part 143, the greater or steeper conical surface 147 and the cylindrical part 145 are formed and disposed in conventional relation to produce respectively the surfaces 115, 117 and 119 of the modified blank of FIG. 6.

As shown in FIG. 7 also a second plug member 151 which provides a conical surface 153, a cylindrical surface 155 and a connecting conical surface 157 corresponding to the surfaces 143, 145 and 147 of the plug 137 is disposed within the sleeve 133. In the positions of the plugs 137, 151 shown in FIG. 7 in which the plug 137 is fully inserted in the sleeve, the ends of the conical portions 143, 153 are adjacent and may abut when the die pressing operation is completed. It will be understood that the extruded blank 12 trimmed as shown in FIG. 5 may be inserted in the space defined by the inner surface 135 of the sleeve 133 and with the right hand end of the blank 12 in engagement with the conical portion 153 at some circular periphery thereof. The plug 137 then may be inserted in the bore 135 of the sleeve and pressure may be brought upon the plug 137 by some suitable means, not shown, to force the plug toward the right. The reaction of this pressure which is transmitted through the blank 12 to the plug 151 is transmitted through the shaft 159 of the plug 151 to a flange 161 bearing against the end surface 163 of the die element 127. Upon completion of the movement of the plug 137 to the position shown in FIG. 7 the cylindrical trimmed blank 12 will be modified in the contour of the inner surface thereof along the axis to the form shown in FIG. 6.

Upon release of the pressure upon the plug 137 and removal thereof from the sleeve 133, an ejector element 165 disposed within the bore 135 of the sleeve 133 and in the bore 167 of the same diameter in the die element 127 will effect movement of the now modified blank toward the left with respect to the plug 151 to free the modified blank from this plug. This movement toward the left to free the blank is effected by the spring 169 bearing at the right hand end thereof against the nut 171 threaded on the shaft 159. The spring 169 bears against a flange 173 of a bushing 174, this flange in turn engaging the end of the ejector 165. Full movement of the ejector and of the modified blank may be accomplished by moving the flange 161 toward the left against the nut 171 and shaft 159 by effecting, by suitable power means in FIG. 7, movement of a rod 175 upon which the flange 161 is formed.

The apparatus of FIG. 7 is conventional but it is to be noted particularly that where the inner surface 135 of the sleeve 133 is of proper cylindrical form and diameter with respect to the diameter of the trimmed extruded blank 12, and where the inner surface of the blank 12 is truly circular and especially truly cylindrical and concentric with the true cylindrical outer surface of the blank 12, then the contours about the axis of the modified sleeve of FIG. 6 all will be circular at each point along the axis, both with respect to the conical portions of the inner surface as well as with respect to the cylindrical portion of this inner surface, and these portions of the inner surface will be concentric with the cylindrical outer surface of the modified blank.

There thus is obtained by the steps of the method of the invention, whether the threads are to be cut or rolled as machine or screw threads or as pipe threads upon the inner surface of the coupling, an inner surface which is of truly circular contour at each plane transverse to the axis along the axis, and the contour along the axis may be made of any desired configuration which is requisite or desirable for the type of threads to be formed in the coupling. The method of the invention, therefore, includes the steps of disposing a blank of generally annular form in position so that it may be moved through an annular circular extruding orifice and the step of forcing the wall of this blank through this orifice, so that at least the inner surface of the blank about the axis of the orifice and preferably both the inner surface and the outer surface are formed with a true circular contour in each transverse plane along the axis. It is a significant feature of the invention that when such a truly circular blank thus is produced, the blank may be modified in the configuration of its contour along the axis to provide for the particular type of thread which it is desired to form internally in the coupling and that this modified blank will retain in its internal surface a contour which is truly circular in transverse section at each point along the axis.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. Method of preparing a pipe coupling blank or the like for threading with an internal thread, said coupling blank being formed with an annular generally cylindrical wall, which comprises disposing said blank at one side of an annular circular extruding orifice so that said annular wall extends about and is generally coaxial with the axis of said orifice, moving said blank parallel to said axis concomitantly with forcing said wall thereof through said annular circular orifice to true the inner surface of said blank about said axis of said orifice to circular section concentric with said axis of said orifice, and then upsetting said trued blank to shape said inner surface of said wall of trued circular section to a contour along the axis of said annular wall to conform to the shape required by the internal threads to be formed in said coupling wall.

2. Method of preparing a pipe coupling blank or the like for threading with an internal thread, said coupling blank being formed with an annular generally cylindrical wall, which comprises disposing said blank at one side of an annular circular extruding orifice so that said annular wall extends about and is generally coaxial with the axis of said orifice, moving said blank parallel to said axis concomitantly with forcing said wall thereof through said annular circular orifice to true the inner surface of said blank about said axis of said orifice to circular section concentric with said axis of said orifice, and then upsetting said trued blank to thicken the annular wall thereof and to shape said inner surface of said wall of trued circular section to a contour along the axis of said annular wall to conform to the shape required by the internal threads to be formed in said coupling wall.

3. Method of producing a pipe coupling provided with an internal thread which comprises forming a coupling blank with an annular generally cylindrical wall, disposing said blank at one side of an annular circular extruding orifice so that said annular wall extends about and is generally coaxial with the axis of said orifice, moving said blank parallel to said axis concomitantly with forcing said wall thereof through said annular circular orifice to true the inner and outer surfaces of said blank about said axis of said orifice to circular section concentric with said axis of said orifice, upsetting said trued blank to thicken the annular wall thereof and to shape said inner surface of said wall of trued circular section to a contour along the axis of said annular wall to conform to the shape required by an internal thread to be formed in said coupling wall, and forming an internal thread in said annular wall at said internal surface thereof.

4. Method of producing a threaded pipe coupling from a coupling blank with an annular generally cylindrical wall, which comprises disposing said blank at one side of an annular circular extruding orifice so that said annular wall extends about and is generally coaxial with the axis of said orifice, moving said blank parallel to said axis concomitantly with forcing said wall thereof through said annular circular orifice to true the inner surface of said blank about said axis of said orifice to circular section concentric with said axis of said orifice, upsetting said trued blank to thicken the annular wall thereof and to shape said inner surface of said wall of trued circular section to a contour along the axis of said annular wall to conform to the shape required by an internal thread to be formed in said wall, and forming an internal thread in said annular wall at said internal surface thereof.

5. Method of preparing a pipe coupling blank or the like for threading with an internal thread, said coupling blank being formed with an annular generally cylindrical wall, which comprises truing the inner surface of said blank about an axis to conform to the shape of a cylinder concentric with said axis, and then upsetting said trued blank to shape said trued inner surface to a contour along the axis of said wall to conform to the shape required by the internal threads to be formed in said wall.

References Cited by the Examiner

UNITED STATES PATENTS

| | | | |
|---|---|---|---|
| 263,943 | 9/1883 | Morse | 285—333 |
| 2,168,300 | 8/1939 | Lemming | 72—370 |
| 2,176,993 | 10/1939 | Gazey | 29—157 |
| 2,440,651 | 4/1948 | Bell | 285—333 |
| 2,480,011 | 8/1949 | Freter | 29—157 X |
| 2,494,128 | 1/1950 | Holmquist et al. | 72—367 |
| 2,583,270 | 1/1952 | Lynall. | |
| 2,886,170 | 5/1959 | Kerr | 205—8 X |
| 3,165,199 | 1/1965 | Tlaker | 72—370 |

OTHER REFERENCES

U.S. Steel, "The Making, Shaping and Treating of Steel," 7th ed., p. 780, 1957.

CHARLES W. LANHAM, *Primary Examiner.*

WHITMORE A. WILTZ, *Examiner.*

J. C. HOLMAN, L. A. LARSON, *Assistant Examiners.*